Figure 1:
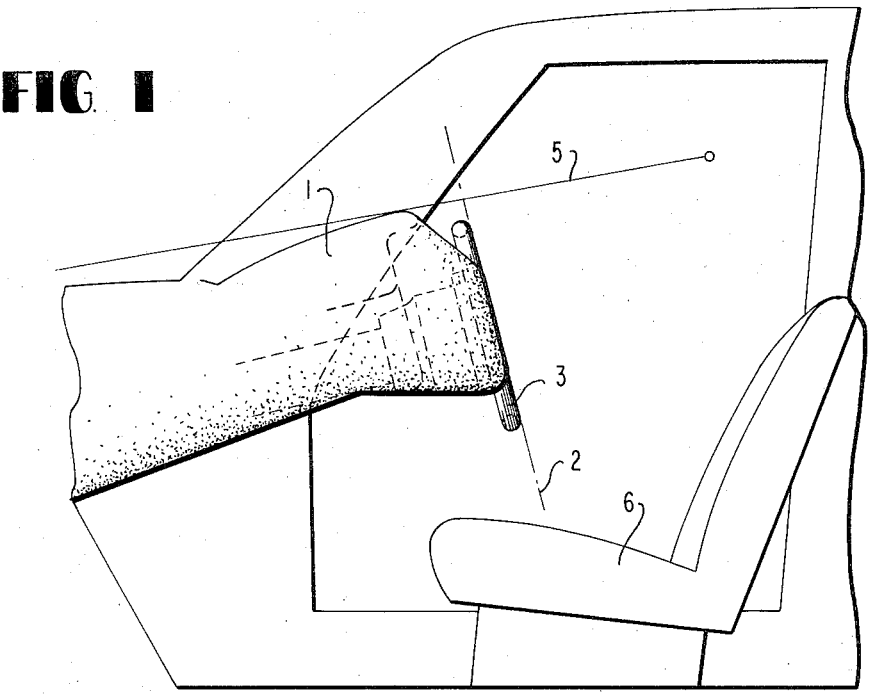

United States Patent [19]
Breitschwerdt et al.

[11] 3,820,621
[45] June 28, 1974

[54] SAFETY INSTRUMENT PANEL

[75] Inventors: Werner Breitschwerdt, Stuttgart; Hermann Renner, Boblingen, both of Germany

[73] Assignee: Daimler-Benz Aktiengesellschaft, Stuttgart-Unterturkheim, Germany

[22] Filed: Sept. 14, 1971

[21] Appl. No.: 180,377

[30] Foreign Application Priority Data
Sept. 17, 1970 Germany............................ 2045960

[52] U.S. Cl. ................................ 180/90, 280/150 B
[51] Int. Cl. .............................................. B60r 21/04
[58] Field of Search............ 280/150 B, 87; 180/90, 180/78

[56] References Cited
UNITED STATES PATENTS

| | | | |
|---|---|---|---|
| 2,091,059 | 8/1937 | Tjaarda............................... | 180/90 |
| 2,866,357 | 12/1958 | Houghtaling................ | 280/150 B X |
| 2,966,952 | 1/1961 | Wilfert................................ | 180/90 |
| 3,088,539 | 5/1963 | Mathues............................. | 180/90 |
| 3,380,548 | 4/1968 | Bauer.................................. | 180/90 |
| 3,439,769 | 4/1969 | Brilmyer............................. | 180/90 |
| 3,468,556 | 9/1969 | Smith............................ | 280/150 B |
| 3,498,402 | 3/1970 | Barenyi............................... | 180/90 |
| 3,560,041 | 2/1971 | Foster............................ | 280/150 B |
| 3,645,353 | 2/1972 | Cope................................... | 180/90 |

OTHER PUBLICATIONS
Pamphlet, "Cornell–Liberty Safety Car," Pages 11 & 12, 1/20/58.

*Primary Examiner*—David Schonberg
*Assistant Examiner*—Terrance L. Siemens
*Attorney, Agent, or Firm*—Craig & Antonelli

[57] ABSTRACT

A safety instrument panel for vehicles, especially passenger motor vehicles in which the instrument panel is extended into the passenger space either over its entire width or only on the driver's side, up to the area of the steering wheel plane and is provided within the area of the steering wheel rim with such a large aperture as is necessary for an unimpaired steering.

35 Claims, 6 Drawing Figures

INVENTORS
WERNER BREITSCHWERDT
HERMANN RENNER

BY Craig, Antonelli & Hill
ATTORNEYS

INVENTORS
WERNER BREITSCHWERDT
HERMANN RENNER

SAFETY INSTRUMENT PANEL

The present invention relates to a safety instrument panel for motor vehicles, especially for passenger motor vehicles.

Instrument panels of the most varied types of constructions are known. However, they all entail the disadvantage that in case of an accident vehicle passengers impinging thereon may suffer serious injuries at the instrument panel itself or at the instruments or actuating elements mounted thereon. In order to counteract this injury danger, known for quite some time, one has rounded off the edges of the instrument panel and covered the same with plastic material or the like. While one is able by these measures to reduce the injuries in case of slight accidents, there still exists as before the great disadvantage that in case of serious frontal collisions or lateral collisions the vehicle passengers impinge on the instrument panel and may suffer serious injuries.

Another possibility to reduce the injury danger of the passengers at the instrument panels can be seen in the constructional proposals to keep the distance between the front seats and the instrument panel as large as possible and to fasten the vehicle passengers by means of safety belts. The disadvantage of these proposals, however, resides in the fact that a driver, secured by the safety belts in the prescribed manner, can reach the actuating elements at the instrument panel only with difficulties so that frequently the fastening of the safety belts is completely dispensed with. The disadvantage of the injury danger at the instrument panel is then accepted. The construction of the prior art instrument panels has additionally proved itself as very inappropriate in case of accident impacts impinging on the vehicle from the side since especially the person seated next to the driver may receive serious injuries by the lateral impingement on the actuating elements and especially against the steering wheel.

The present invention is concerned with the task to eliminate the disadvantages of the prior art instrument panels and to provide a safety instrument panel by means of which the passengers are protected against injuries in case of impingement and in which the actuating and indicating instruments are so appropriately arranged that they can be readily viewed or reached by the driver in every seat position and do not contribute to the injury danger of the vehicle passengers.

The underlying problems of the present invention are solved in that the instrument panel is extended forwardly, either over its entire width or only on the driver's side, up to within the area of the steering wheel plane and is provided within the area of the steering wheel rim with such a large aperture or recess as is necessary for an unimpaired steering. It is thereby particularly appropriate if the instrument panel is yielding constructed over a relatively large deformation path corresponding to the function of a deformation member so that the impact energy of body parts of the vehicle passengers impinging on the instrument panel is dissipated. Already by the essentially flat construction of the instrument panel the impact area is considerably enlarged and therewith the specific surface pressure at the impinging body parts is considerably reduced. In a further advantageous embodiment of the present invention the instrument panel may be covered by a layer of conventional foamed material or the like or may be formed itself of energy-dissipating plastic material or the like. It is also feasible, for example, to make the instrument panel of materials having different strengths in that the surface is, for example, relatively soft and yielding and the substructure is less yielding so that smaller impacts are absorbed elastically and do not yet cause any deformation of the instrument panel. However, it is appropriate in every case if the yieldingness of the instrument panel within the steering wheel area is matched to the yieldingness of the safety steering and preferably is greater than the latter, especially if the steering system involves a conventional safety steering utilizing deformation members or the like.

In order to further reduce the injury danger of the forwardly seated vehicle passengers, it is very appropriate if the actuating and indicating instruments are arranged recessed in the projecting instrument panel inside the recess and/or laterally adjacent the steering wheel. The indicating instruments may also be arranged inside the recess and the actuating elements such as toggle switches, push buttons and/or the like may be arranged recessed in the projecting instrument panel. Since the actuating elements are then arranged at the height of the steering rim adjacent the steering wheel, the actuating elements and also readily accessible to and actuatable by the driver when the latter has the seat belt fastened.

According to a further advantageous embodiment of the subject matter of the present invention the instrument panel may extend downwardly in a bracket-like manner preferably in the vehicle center and may form a hollow space accessible from the passenger side of the vehicle for the accommodation of further actuating elements, such as for example, the gear shifting lever, the hand brake, the radio or the like. It is advantageously achieved thereby that both the driver as well as the person seated alongside the driver are protected against injuries at the hand brake or at the shifting lever. Further advantages of the instrument panel according to the present invention reside in that neither the driver nor the person seated alongside the driver can be injured at the steering wheel or at the projecting instruments or actuating elements in case of accident impacts impinging laterally on the vehicle since the instruments and/or actuating elements are arranged recessed in the instrument panel. The storage compartments can be constructed of large volume and finally a considerable damping of the engine noises is achieved by the use therefor of energy-dissipating material.

Accordingly, it is an object of the present invention to provide a safety instrument panel which avoids by simple means the aforementioned shortcomings and drawbacks encountered in the prior art.

Another object of the present invention resides in a safety instrument panel for motor vehicles, especially passenger motor vehicles which considerably increases the safety of the persons seated in the front seat of the vehicle against injuries that might result from front end collisions as well as from lateral impact collisions.

A further object of the present invention resides in a safety instrument panel which effectively protects the person seated in the front seats of the vehicle yet permits ready access to the instruments and operating elements of the instrument panel on the part of the driver of the vehicle even after the seat belts are fastened.

A still further object of the present invention resides in a safety instrument panel which is simple in construction yet optimizes the actuation and supervision of the operating elements and instruments during normal driving conditions.

Another object of the present invention resides in an instrument panel which additionally protects the persons seated on the front seats of the vehicle against injuries stemming from the hand brake, the gear shifting lever or similar projecting parts.

Still another object of the present invention resides in an instrument panel for passenger motor vehicles which considerably improves the driving comfort by damping engine noises due to the use of energy-dissipating material for the instrument panel.

Figure 2:
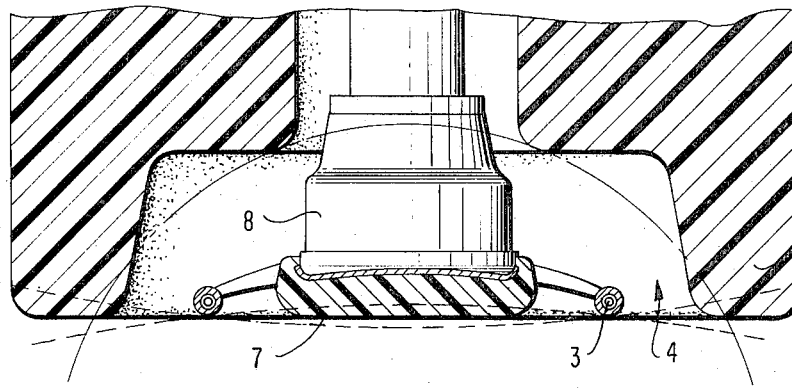
Figure 3:
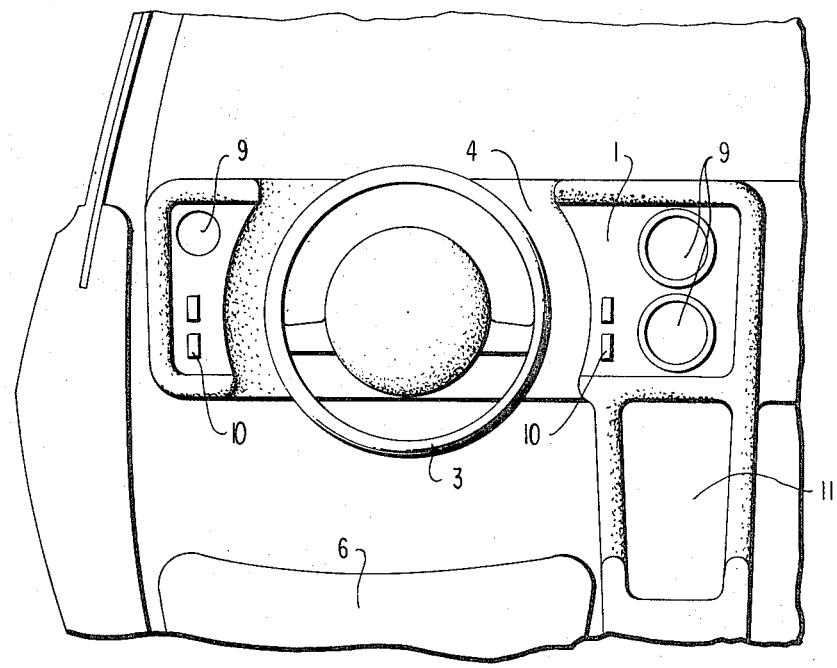
Figure 4:
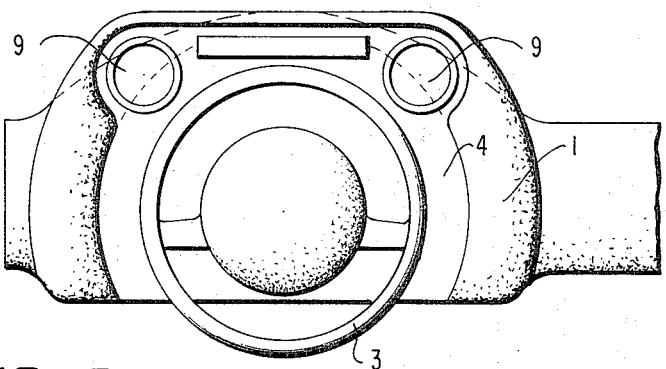
Figure 3A:
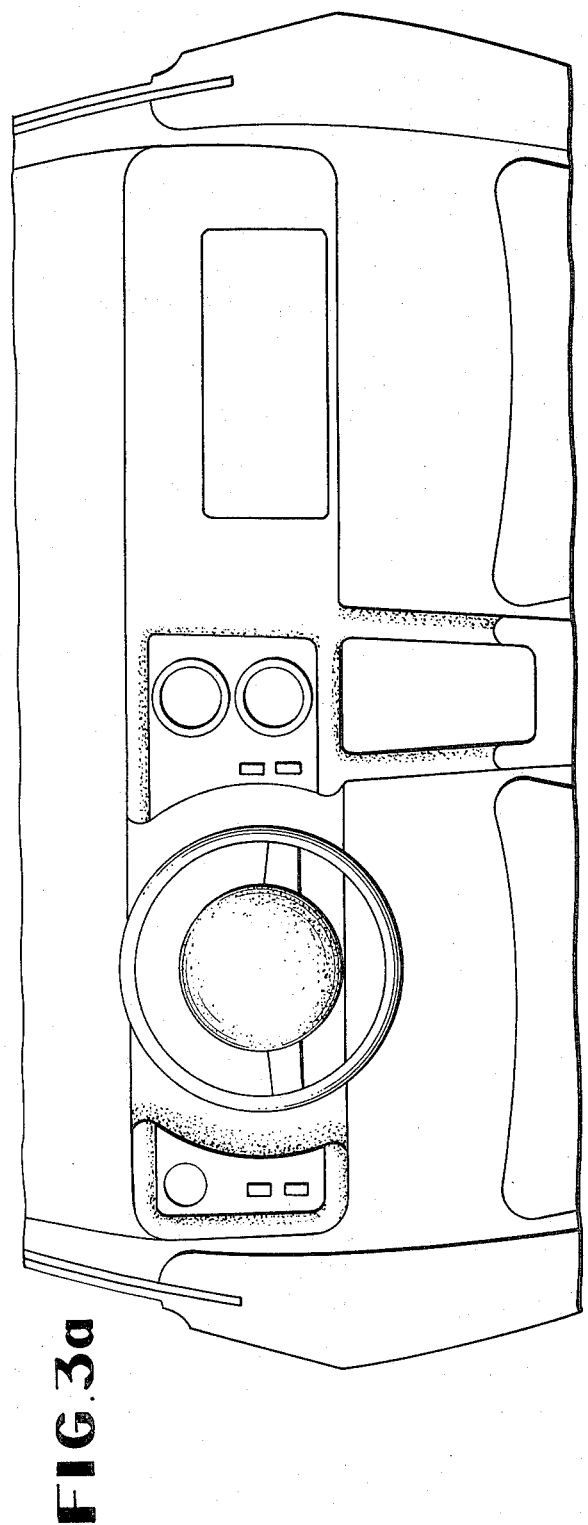
Figure 5:
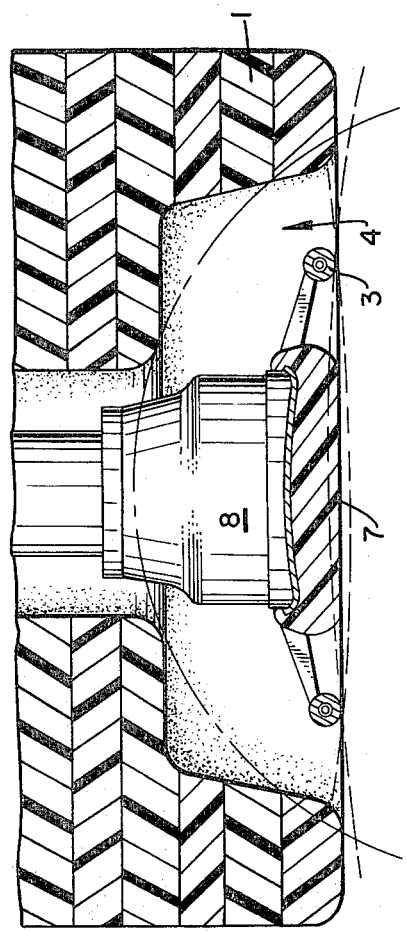

These and further objects, features and advantages of the present invention will become more apparent from the following description when taken in connection with the accompanying drawing which shows, for purposes of illustration only, several embodiments in accordance with the present invention and wherein:

FIG. 1 is a schematic partial longitudinal cross-sectional view through a motor vehicle equipped with an instrument panel in accordance with the present invention, FIg. 2 is a partial plan view of the instrument panel as seen from above, FIG. 3 is a somewhat schematic elevational view of a modified embodiment of an instrument panel in accordance with the present invention as viewed in the normal direction of sight of the driver, FIG. 3a is a somewhat schematic elevational view of another embodiment of an instrument panel in accordance with the present invention, FIG. 4 is a somewhat schematic elevational view, similar to FIG. 3, of a still further modified embodiment of an instrument panel in accordance with the present invention, as viewed in the normal direction of sight of the driver, and FIG. 5 is a partial plan view of the instrument panel, as seen from above, showing layers of foam material.

Referring now to the drawing wherein like reference numerals are used throughout the various views to designate like parts, and more particularly to FIG. 1, a passenger motor vehicle is schematically illustrated in this figure in a partial longitudinal cross section. The safety instrument panel 1 is extended up to the area of the steering wheel plane 2 and is provided within the area of the steering wheel rim 3 with such a large aperture or recess generally designated by reference numeral 4 as is required for an unimpaired steering i.e., that the hands can grip the steering rim 3 without touching the instrument panel 1. The hands of the driver are thereby in the recess 4. The instrument panel 1 is so constructed in its height that it does not impair the direction of sight 5 of the driver when seated normally on the seat 6. The instrument panel 1 is constructed yieldingly for a relatively large deformation path corresponding to the function of a deformation member so that the impact energy of body parts of the vehicle passengers impinging on the instrument panel is dissipated.

The safety instrument panel 1 illustrated in FIG. 2 is extended only on the driver's side up to within the area of the steering wheel plane 2. However, as shown in FIG. 3a, the safety instrument panel 1 may be extended over the entire width of the vehicle, instead of only on the driver's side. The impact surface 7 of the safety steering 8 forms together with the surface of the instrument panel 1 a single plane so that by reason of the considerably enlarged impact surface the specific surface pressure at the impinging body parts is reduced during an impact of the driver. The instrument panel 1 may be covered by a layer of foamed material of any known type or the like, as illustrated in FIG. 5, or may be made itself of energy-dissipating plastic material, as illustrated in FIG. 2. Any known plastic, for example, synthetic-energy dissipating material may be used thereby, for example, synthetic resinous materials of various types as are known for that purpose. The yieldingness of the instrument panel 1 is matched at least within the steering wheel area to the yieldingness of the safety steering structure 8 and is preferably greater than the yieldingness of the safety steering structure 8.

It can be seen from FIGS. 3 and 4 that the actuating controls and indicating instruments 9, 10 are arranged recessed in the projecting instrument panel 1 within the aperture 4 and laterally adjacent the steering wheel rim 3. It is appropriate if the indicating instruments 9 are arranged within the recess 4 and the actuating control elements such as toggle switches, push buttons 10 or the like are arranged recessed in the projecting instrument panel 1.

It can also be seen from FIG. 3 that the instrument panel 1 extends downwardly bracket-like in the vehicle center and forms a hollow space 11 accessible from the inside of the vehicle for the accommodation of further actuating elements such as for example, of the gearshift lever, of the hand brake, of the radio or the like which are not shown in the drawing for the sake of simplicity. The bracket-like construction of the instrument panel also offers the advantage that the co-driver seat is better separated from the driver seat and a lateral throwing-over of the co-driver or of the driver to the respective other side is avoided in case of an accident.

While we have shown and described several embodiments in accordance with the present invention, it is understood that the same is not limited thereto, but is susceptible of numerous changes and modifications as known to those skilled in the art and we therefore do not wish to be limited to the details shown and described herein but intend to cover all such changes and modifications as are encompassed by the scope of the appended claims.

We claim:

1. A safety instrument panel for motor vehicles comprising a steering means including a steering wheel oriented approximately in a vertical plane and an instrument panel forming an impact surface disposed substantially in the plane of the steering wheel, said instrument panel having a recess means disposed about the area of the steering wheel allowing unimpaired operation of the steering wheel, and said instrument panel supporting indicating and actuating means in at least one of said recess means and additional recess means arranged substantially in said impact surface.

2. A safety instrument panel according to claim 1, characterized in that the impact surface of the instrument panel has an approximately vertical dimension corresponding to substantially the diameter of said steering wheel.

3. A safety instrument panel according to claim 1, characterized in that the recess means is concentrically disposed about the steering wheel rim at a distance sufficient to allow the steering wheel to be gripped without touching the instrument panel.

4. A safety instrument panel according to claim 1, characterized in that the instrument panel is disposed in the steering wheel plane over the entire width of the instrument panel.

5. A safety instrument panel according to claim 1, characterized in that the instrument panel is disposed in the steering wheel plane only on the driver's side.

6. A safety instrument panel according to claim 1, characterized in that the actuating and indicating means are arranged in the recess means.

7. A safety instrument panel according to claim 1, characterized in that the actuating and indicating means are recessed in a portion of the instrument panel, said portion being adjacent to the steering wheel rim.

8. A safety instrument panel according to claim 1, characterized in that the actuating and indicating means are recessed in a first portion of the instrument panel within the recess means and a second portion of the instrument panel adjacent to the steering wheel rim.

9. A safety instrument panel according to claim 1, characterized in that the indicating means are arranged inside the recess means and the actuating control means are recessed in the instrument panel.

10. A safety instrument panel according to claim 1, characterized in that the instrument panel extends downwardly with the downward extension having a hollow space accessible from the inside of the vehicle for the accommodation of further actuating elements.

11. A safety instrument panel according to claim 10, characterized in that the instrument panel extends downwardly substantially in the vehicle center.

12. A safety instrument panel according to claim 1, characterized in that the steering means is yieldingly constructed having a yieldingness matched to that of the instrument panel.

13. A safety instrument panel according to claim 12, characterized in that the yieldingness of the instrument panel in the steering wheel area is larger than the yieldingness of the steering means.

14. A safety instrument panel according to claim 1 characterized in that the instrument panel is yieldingly constructed over a relatively large deformation path corresponding to the function of a deformation member so that the impact energy of body parts of the passengers impinging on the instrument panel is dissipated.

15. A safety instrument panel according to claim 14, characterized in that the instrument panel is covered by a layer of foamed material.

16. A safety instrument panel according to claim 14, characterized in that the instrument panel is itself constructed of energy-dissipating plastic materials.

17. A safety instrument panel according to claim 14, characterized in that the actuating and indicating means are arranged in the recess means.

18. A safety instrument panel according to claim 14, characterized in that the actuating and indicating means are recessed in a portion of the instrument panel, said portion being adjacent to the steering wheel rim.

19. A safety instrument panel according to claim 14, characterized in that the actuating and indicating means are recessed in a first portion of the instrument panel within the recess means and a second portion of said instrument panel adjacent to the steering wheel rim.

20. A safety instrument panel according to claim 14, characterized in that the indicating means are arranged inside the recess means and the actuating control means are recessed in the instrument panel.

21. A safety instrument panel according to claim 14, characterized in that the steering means is yieldingly constructed having a yieldingness matched to that of the instrument panel.

22. A safety instrument panel according to claim 21, characterized in that the yieldingness of the instrument panel in the steering wheel area is larger than the yieldingness of the steering means.

23. A safety instrument panel according to claim 14, characterized in that the instrument panel extends downwardly with the downward extension having a hollow space accessible from the inside of the vehicle for the accommodation of further actuating elements.

24. A safety instrument panel according to claim 23, characterized in that the instrument panel extends downwardly substantially in the vehicle center.

25. A safety instrument panel according to claim 24, characterized in that the instrument panel is disposed in the steering wheel plane over the entire width of the instrument panel.

26. A safety instrument panel according to claim 24, characterized in that the instrument panel is disposed in the steering wheel plane only on the driver's side.

27. A safety instrument panel according to claim 24, characterized in that the instrument panel is covered by a layer of foamed material.

28. A safety instrument panel according to claim 24, characterized in that the instrument panel is itself constructed of energy-dissipating plastic materials.

29. A safety instrument panel for motor vehicles comprising a steering means including a steering wheel and an instrument panel disposed substantially in the plane of the steering wheel, said instrument panel having a recess means disposed about the steering wheel rim at a distance sufficient to allow the steering wheel rim to be gripped without touching the instrument panel, and said instrument panel supporting vehicle indicating and actuating means in at least one of said recess means and additional recess means arranged substantially in said plane.

30. A safety instrument panel according to claim 29, characterized in that the instrument panel is disposed in the steering wheel plane over the entire width of the instrument panel.

31. A safety instrument panel according to claim 29, characterized in that the instrument panel is disposed in the steering wheel plane only on the driver's side.

32. A safety instrument panel according to claim 29, characterized in that the actuating and indicating means are arranged in the recess means.

33. A safety instrument panel according to claim 29, characterized in that the actuating and indicating means are recessed in a portion of the instrument panel, said portion being adjacent to the steering wheel rim.

34. A safety instrument panel according to claim 29, characterized in that the steering means is yieldingly constructed having a yieldingness matched to that of the instrument panel.

35. A safety instrument panel according to claim 34, characterized in that the yieldingness of the instrument panel in the steering wheel area is larger than the yieldingness of the steering means.

* * * * *